(12) United States Patent
Smart et al.

(10) Patent No.: US 7,607,619 B2
(45) Date of Patent: Oct. 27, 2009

(54) SLOTTED CONDUIT SUPPORT BLOCK SYSTEM

(75) Inventors: Ken Smart, Caldwell, ID (US); Terry K. Tidwell, Parma, ID (US)

(73) Assignee: Freedom, Inc., Parma, ID (US)

( * ) Notice: Subject to any disclaimer, the term of this patent is extended or adjusted under 35 U.S.C. 154(b) by 727 days.

(21) Appl. No.: 11/218,168

(22) Filed: Aug. 31, 2005

(65) Prior Publication Data

US 2007/0045482 A1 Mar. 1, 2007

(51) Int. Cl.
*F16L 3/08* (2006.01)
*E04C 5/16* (2006.01)

(52) U.S. Cl. .................. 248/74.1; 248/68.1; 52/677; 52/683; 52/684

(58) Field of Classification Search ............. 52/677, 52/683, 684, 685, 686; 248/74.1, 68.1
See application file for complete search history.

(56) References Cited

U.S. PATENT DOCUMENTS

| | | | |
|---|---|---|---|
| 4,429,440 A | 2/1984 | Laughlin et al. | |
| 4,502,653 A | 3/1985 | Curtis, Jr. | |
| 4,513,934 A * | 4/1985 | Pruyne | 248/49 |
| 4,516,296 A * | 5/1985 | Sherman | 24/279 |
| 4,899,963 A * | 2/1990 | Murphy | 248/65 |
| 5,163,642 A | 11/1992 | Torrens et al. | |
| 5,533,696 A | 7/1996 | Laughlin et al. | |
| 5,829,718 A | 11/1998 | Smith | |
| 5,855,342 A | 1/1999 | Hawkins et al. | |
| D427,049 S | 6/2000 | Neider et al. | |
| D433,615 S | 11/2000 | Neider et al. | |
| D436,522 S | 1/2001 | Neider et al. | |
| 6,305,650 B1 | 10/2001 | Hawkins et al. | |
| 6,364,256 B1 | 4/2002 | Neider et al. | |
| D466,393 S | 12/2002 | Neider et al. | |
| D466,394 S | 12/2002 | Neider et al. | |
| 6,520,456 B1 | 2/2003 | Neider et al. | |
| 6,679,461 B1 * | 1/2004 | Hawkins | 248/74.2 |
| D498,660 S | 11/2004 | Neider et al. | |
| D498,661 S | 11/2004 | Neider et al. | |
| 7,007,978 B1 * | 3/2006 | Purdom | 280/809 |
| D521,851 S * | 5/2006 | Smart | D8/354 |
| 7,441,731 B2 * | 10/2008 | Smart et al. | 248/74.1 |

* cited by examiner

*Primary Examiner*—Richard E Chilcot, Jr.
*Assistant Examiner*—Chi Q Nguyen
(74) *Attorney, Agent, or Firm*—Pedersen & Co., PLLC; Ken J. Pedersen; Barbara S. Pedersen

(57) ABSTRACT

A system and device for installing and mounting conduit upon a surface such as a roof The system made up of at least one support block having a body with a base and an upper portion, the upper portion having a channel defined by two upright portions each of these upright portions having an upper surface, the upper surface defining an aperture, the aperture extends from the upper surface of the upright portion down into the hollow cavity which is defined by the body. These apertures are dimensioned so as to allow a portion of an adaptable conduit connecting device to fit and be held in a desired position within said aperture.

5 Claims, 6 Drawing Sheets

SLOTTED CONDUIT SUPPORT BLOCK SYSTEM

BACKGROUND OF THE INVENTION

1. Field of the Invention

The present invention generally relates to devices used in the installation and mounting of elongated tubular material such as pipes, conduit and wire over and across a surface, and more particularly to installation and mounting of such items upon a generally horizontally disposed surface such as a roof or floor.

2. Background Information

Many features of modern construction provide convenience by allowing a party to simply and easily access items from a distant location. Examples of such devices include plumbing, heating, ventilating and air conditioning systems. In many of these instances needed materials such as natural gas, electricity, water, and other items are transported from one location to another through a conduit. These conduits must be permanently attached in one location so as to support the conduit while preventing the conduit from being damaged or moved out of a desired alignment and position.

One of the ways in which this is done is through mounting devices that are mounted or secured in a desired location so as to support and maintain the stability of these devices. In mounting or securing such items there are several considerations that must be taken into account. Some of these considerations include: the weight of the pipes on the roof, the possible damage to the roof and the environmental considerations in which the system will be placed. Mounting systems must have sufficient strength so as to support a designated item in a desired position and orientation upon a roof. Mounting systems must also be of a material that will not cause damage to the roof or floor, or other surface that underlies the position wherein the mounting system is placed. If damage to the surface were to occur, for example in the instance of a roof, damage to the underlying roof could cause additional damage to the interior of the building.

Other considerations that must also be taken into account include providing a means for allowing the general slope of the conduit to be maintained and adjusted in such a way so as to allow the desired flow and positioning of materials through the transport tube. In some instances, such as those occurrences wherein a party is dealing with gravity fed drain lines, an appropriate slope must be accommodated so as to ensure the proper drainage of the pipes from a first location to a discharge area. In other modifications the general level of the pipe must be left level so as to ensure the appropriate rate of flow of materials through these devices. In other applications, the appropriate positioning of the device is crucial to the protection and function of the conduits and the materials passed there through.

Another problem that occurs in the prior art is that the weight of the blocks that are placed upon the roof in order to ensure the stability of these conduits are many times burdensomely heavy and thus difficult and bulky for a user to move and install. Another feature that exists in the prior art is that some of the devices utilized in the prior art have inherent limitations because of their size and configurations and do not allow for the placement of multiple pipes or conduit to be run over a designated distance.

Various prior art systems have attempted to address these problems. However, each of these systems has had inherent problems associated with them. One system that is employed in the prior art utilizes the attachment of the tubing to wooden planks with unfinished metal clamps. This system has many limitations. One problem is that significant damage can be caused to the roofing material by wooden planks. This damage is incurred not only from the weight of materials but also by movement of the planks along the surface of the roof as the conduit connected thereto expands and contracts in response to various thermal conditions. Furthermore, in climates where the devices are exposed to water in various forms, the increased exposure to moisture causes the wood to rot and the unprotected metal to rust and therefore requires frequent replacement and repair. Another problem that exists in such an embodiment is that the wooden planks must be shimmed or cut in order to accommodate various height and slope requirements depending upon the conduit that is being mounted. This requires that an installer not only bring all of the bulky wooden pieces and the metal connection parts with him/her onto the roof, but that he/she also bring tools with them so that they can cut, modify and construct bracing of various heights so as to allow for the proper installation of the conduits upon the designated surface.

Therefore what is needed is an improved system for mounting and placing conduits and pipes upon a building structure. What is also needed is a system and device that allows for variable forms of flexibility with pieces that are easy to carry, simple to use and easy to install. What is also needed is a device that provides vertically and horizontally stable support elements connected to a connection device that allows for the placement of multiple variable conduits that are attached to support devices through simple means with limited use of tools. Accordingly, it is an object of the present invention to provide these items.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention is a system and device for installing and mounting conduit upon a surface such as a roof. The system made up of at least one support block having a body with a base and an upper portion, the upper portion having a channel defined by two upright portions each of these upright portions having an upper surface, the upper surface defining an aperture, and the aperture extending from the upper surface of the upright portion down into the hollow cavity which is defined by the body. These apertures are dimensioned so as to allow a portion of an adaptable vertical riser, such as a conduit clamp to fit and be held in a desired position within said aperture. The channel and these upright vertical risers are configured to connect with a variety of types of conduit connection devices.

The support block has a body with a base and an upper portion. The body of the support block is generally hollow and defines an internal cavity that is configured to receive an upper portion of another support block within the hollow body. This allows the support blocks to be stacked one upon the other. In the preferred embodiment of the invention, this configuration is accomplished by providing a support block with a generally tapered configuration wherein the base covers a larger area than the upper portion. The upper portion further defines a channel positioned within an upper portion of the support block. This channel is defined by a pair of upright portions which, in the preferred embodiment, terminate in a generally flat upper surface which has an aperture defined within this upper surface. The channel contains a plurality of projections which extend from the surface of the channel. The channel is configured so as to allow conduit connection devices, such as struts of various sizes and shapes to be fitted in this channel and held in a desired position and orientation.

The generally hollow support block defines an internal cavity within the support block. The internal cavity is configured to receive an upper portion of a second support block. The internal cavity and the second support block are configured so that when a second support block is placed in a first orientation over a first support block, the first support block and the second support block nest together, with the second support block fitting inside of the first support block.

The apertures within the upright portions of the unit extend from the upper surface of the upper portion down into the internal cavity of the support block. These apertures are configured to allow a vertical support element to be passed down through these apertures into the cavity of the block body itself. Indentations upon the upper surface of the block and projections extending from the inner surface of the inner cavity near the apertures are configured to receive portions of a compatibly configured vertical riser portion therein. These features assist to maintain these vertical support elements or risers within their desired and designated location. These vertical support pieces can then be connected with various types of conduits depending upon the specific necessities and needs of the user.

A variety of types of supports and struts can be used with the present device including those sold under the names Uni-Strut™, Power-Strut™, B-Line™, and other similarly adaptable devices which are known to parties of skill in the art. These devices can be utilized within the channel itself so as to allow variously sized conduit to be connected to the strut itself. However, the present invention does not require the use of such struts. The apertures or "slots" of the present invention are configured to receive and hold a vertical adaptable riser such as a conduit clamp within the slots of the device. In the preferred embodiment of the invention the slots are configured so that a conduit clamp can be inserted and twisted within the slots of the device. When this takes place, the inside lip (23 in FIGS. 1,2,4,5 and 6) of the body of the device near the slot engages a part of the conduit clamp and (device 100 in FIG. 6 and holds the conduit clamp in a desired position and orientation within the block. The preferred embodiment of the invention also provides other adaptations for connecting conduit to a support block including the presence of various apertures for connection with other straps, wires, ties or other types of connecting devices.

In the preferred embodiment of the invention, the blocks are preferably made of a high-density UV resistant plastic material, such as ABS, polycarbonate, fiberglass mix or any other suitable material that achieves the necessary functions of the device. These devices prevent damage to the underlying roof surface, while at the same time having sufficient strength so as to support loads of up to 100 lbs. These blocks are also relatively lightweight, which allows a party utilizing the blocks to carry a stack of nested blocks together upon a roof for placement. While upon the roof, the blocks can be removed from their nested position and assembled and placed in a desired position and orientation.

In some embodiments of the present invention, once the blocks are in place, a support rail is placed within the channel in the top portion of the support block, and various attachments may be inserted into the track portion of the portion rail. The conduit is then connected to or brought into contact with the various attachment devices and connected. Such a system provides a significant improvement over the prior art in that it eliminates the major disadvantages of the prior art system and devices that have been previously described and discussed. In addition, because the blocks of the present invention do not require a strut to be used with them, the present invention can be utilized at a significantly lower cost than other systems of devices which exist in the prior art.

The purpose of the foregoing Abstract is to enable the United States Patent and Trademark Office and the public generally, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive in nature.

DESCRIPTION OF THE PREFERRED EMBODIMENTS

Figure 1:
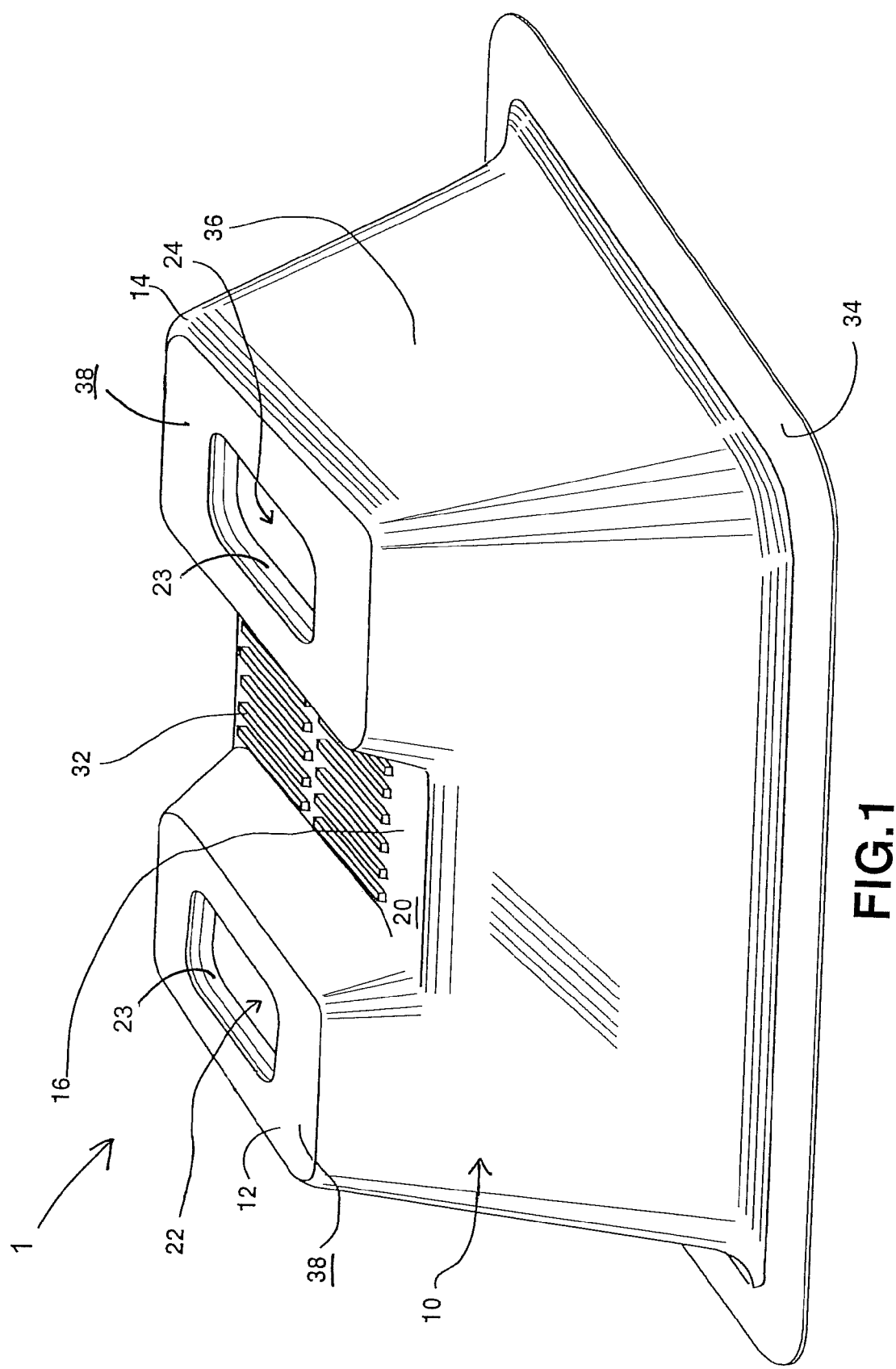
FIG. 1 is a perspective view of the support block described in the preferred embodiment of the present invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

FIGS. 1-6 show various views of the preferred embodiment of the present invention. The present invention is a support block for attaching conduits for various items and utilities upon a surface such as a roof While the preferred embodiment of the invention is shown, it is to be distinctly understood that the invention is not limited thereto but may be variously configured according to the needs and necessities of a user.

Referring first to FIG. 1, a perspective view of the support block 1 is shown. This support block 1 has a body 10, which includes a base 34 and an upper portion 36. In the preferred embodiment of the invention, the base 34 is generally larger than the upper portion 36 and thus provides increased stability of this device over other items, which exist in the prior art. The upper portion 36 of the device includes a pair of spaced raised portions 12, 14 which define a channel 16 between them. In the preferred embodiment this channel has a floor surface 20 which has a plurality of projections 32 which extend from this surface. These projections 32 are configured to allow a portion of a conduit or other material to be inserted between these projections and thus hold these items for a designated period of time in a particular desired location.

Figure 2:
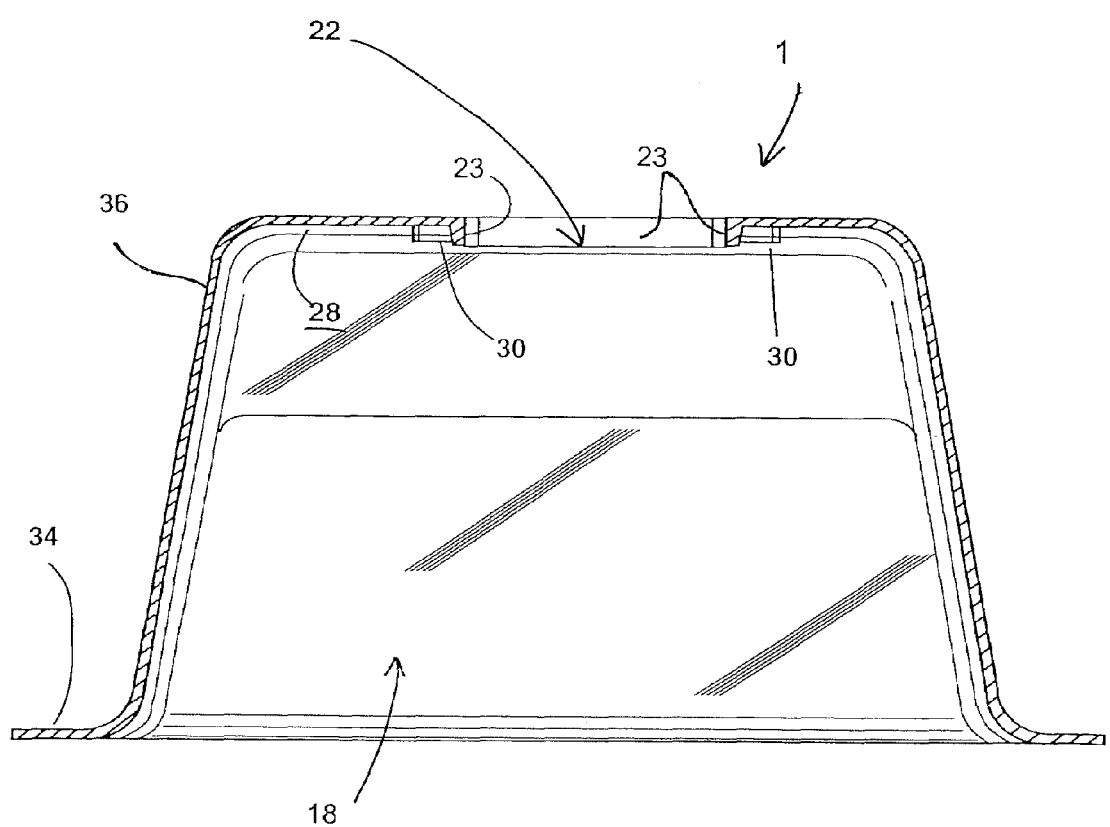
FIG. 2 is a side view of the block of the present invention.
Figure 3:
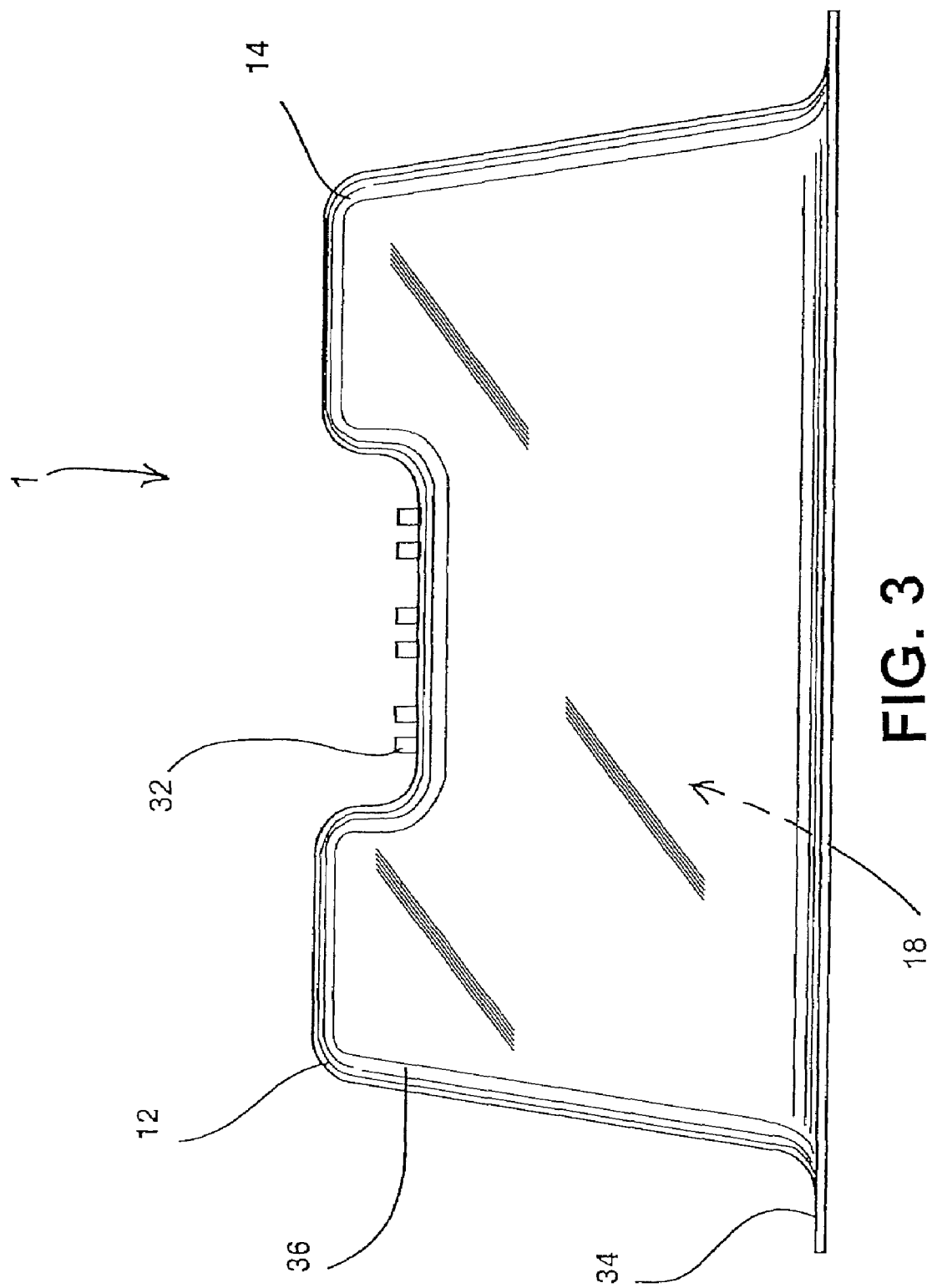
FIG. 3 is an end view of the support block of the present invention.

The upper raised portions 12, 14 each preferably contain a generally flat upper portion surface 38 which define apertures 22, 24. The body 10 of the support block is generally hollow and is configured so as to allow the passage of a vertical adaptive device such as a clamp or other connection device to pass through the aperture and to enter into the cavity 18 which is defined within body 10. Side and end views of the block 10 of the present invention are shown in FIGS. 2 and 3.

Figure 4:
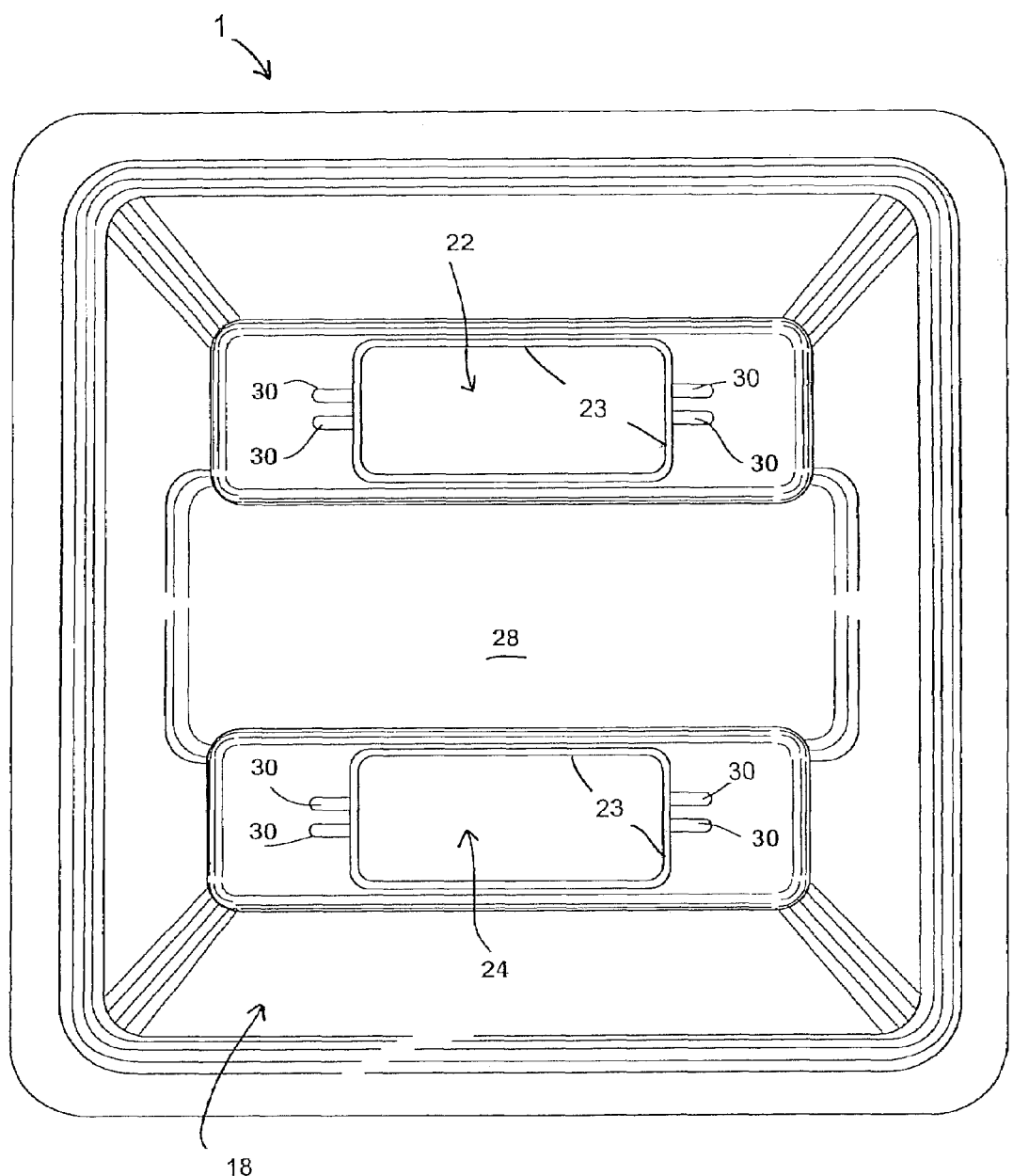
FIG. 4 is a bottom view of the support block of the present invention.
Figure 5:
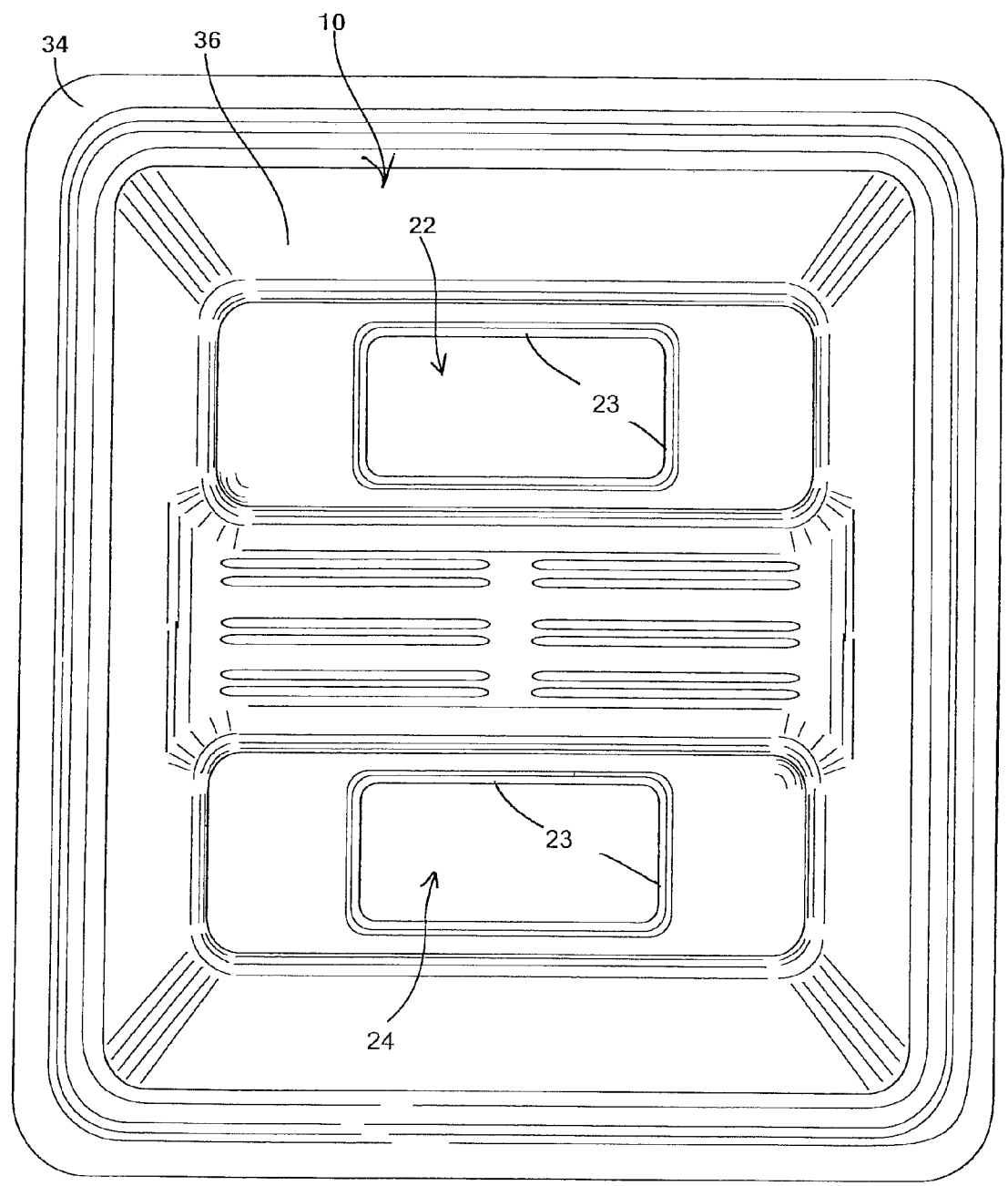
FIG. 5 is a top view of the preferred embodiment of the present invention in a stacked, nested configuration.

FIG. 4 shows a bottom view of the present invention. The body 10 of the block of the present invention is generally hollow and has an inner surface 28 from which inner surface projections 30 extend. These inner surface projections 30 are configured to hold a portion of the adaptive connection device such as a strut, strut holder, rod or other item which is placed through the aperture 22, 24. The configuration of the blocks allow for these blocks to be stacked for ease storage and handling.

Figure 6:
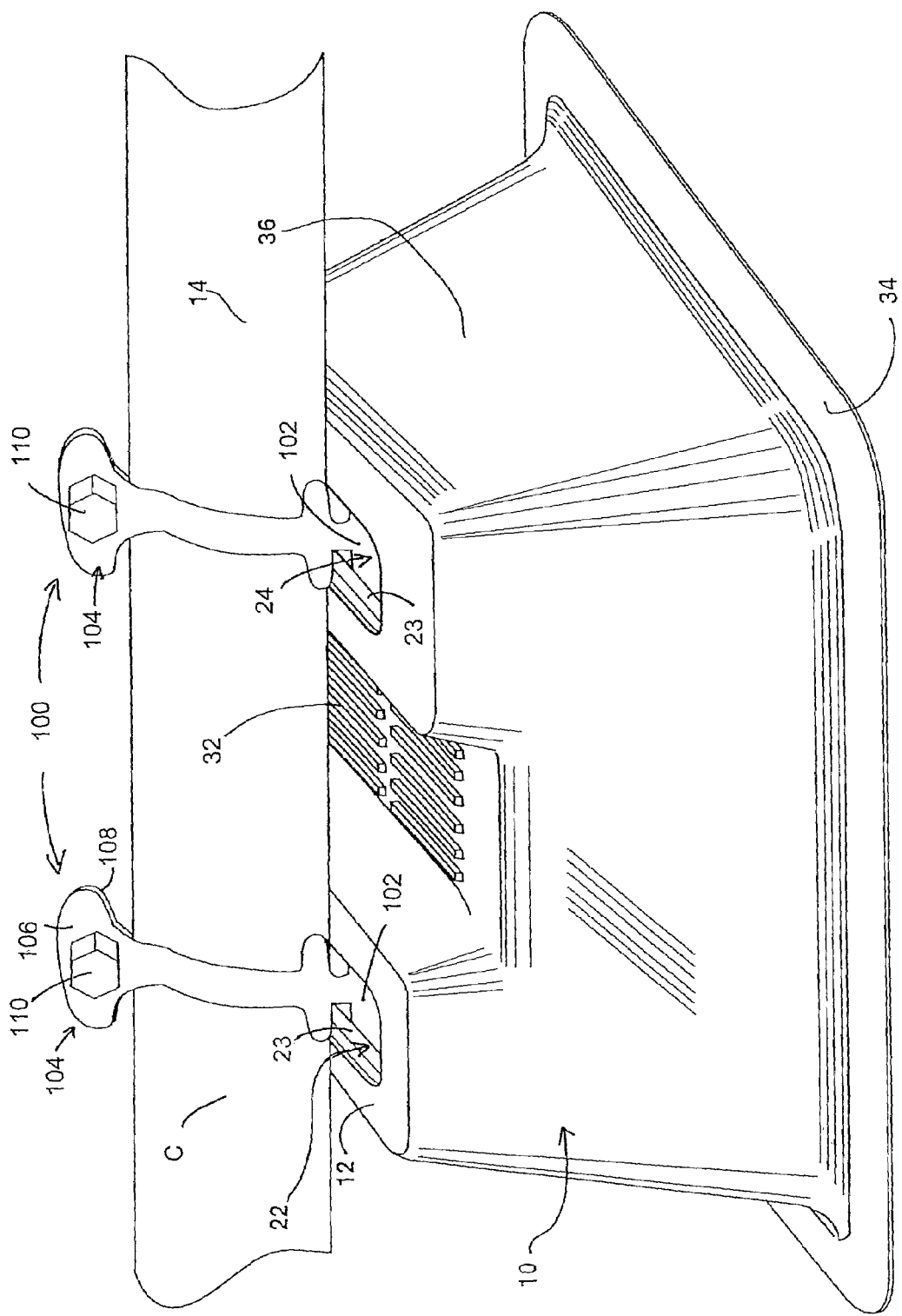
FIG. 6 is a perspective view of the support block of the present invention with piece of conduit attached.

FIG. 6 shows a perspective view of the block of the present invention together with an adaptive device and a portion of a piece of conduit attached to the block of the present invention. These adaptive devices 100 which may be utilized with the present invention are found in a variety of forms and configurations and include but are not limited to devices such as conduit lamps, ties, brackets and other types of connecting devices. While additional spacing devices, or struts are not required to be used with the present invention, their use is similarly not prohibited by the use of the device of the present invention. As may be seen in FIG. 6, the lower end 102 of the adaptive device 100 is received in the internal cavity and engages downwardly-extending lip 23. An upper end 104 of the adaptive device 100 has front arm 106 and rear arm 108 that are bolted (110) together to capture the conduit C.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

We claim:

1. A system for supporting at least one conduit on a roof, the system comprising:
   a support block having a body comprising a lower base for being set on a roof and an upper portion for upending from the roof to support said at least one conduit, the upper portion comprising two spaced, raised portions defining a channel there between, said channel having a channel length;
   wherein said support block body is generally hollow and defines an internal cavity within the support block body; and
   wherein each of said two spaced, raised portions has a flat upper surface that is parallel to said lower base and that has an elongated aperture into said internal cavity, wherein each elongated aperture has an aperture length extending parallel to said channel length; and
   the system further comprising:
   an elongated conduit lying on top of the support block on the flat upper surface of both of said two spaced, raised portions, wherein the elongated conduit is transverse to said channel length and transverse to said aperture length; and
   at least one conduit clamp connecting said elongated conduit to the support block, the conduit clamp having a lower end that is received and held in one of the apertures and an upper end that is bolted around said elongated conduit; and
   wherein said two spaced, raised portions each comprises a lip downwardly-extending into the internal cavity and engaging said lower end of the conduit clamp.

2. The system of claim 1 wherein said inner cavity has a inner surface and wherein projections extend from said inner surface of said inner cavity for maintaining a conduit connecting device in a desired position and orientation.

3. The system of claim 1, wherein said channel has a floor surface and a plurality of projections extending upward from the floor surface, wherein said projections which extend upward from said floor surface of said channel are configured to receive and hold a portion of a strut.

4. The system of claim 1 wherein said support block is manufactured of a high-density UV resistant plastic material.

5. The system of claim 1 wherein the lower base is larger than said upper portion.

\* \* \* \* \*

UNITED STATES PATENT AND TRADEMARK OFFICE
CERTIFICATE OF CORRECTION

| | | |
|---|---|---|
| PATENT NO. | : 7,607,619 B2 | Page 1 of 1 |
| APPLICATION NO. | : 11/218168 | |
| DATED | : October 27, 2009 | |
| INVENTOR(S) | : Smart et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1064 days.

Signed and Sealed this

Twelfth Day of October, 2010

David J. Kappos
*Director of the United States Patent and Trademark Office*